United States Patent [19]
Kocubej

[11] 3,821,489
[45] June 28, 1974

[54] COMBINED RADIO RECEIVER AND TAPE CARTRIDGE PLAYER FOR AUTOMOBILES

[76] Inventor: Israel Kocubej, Ruo da Consolacao n° 1595, Sao Paulo, Brazil

[22] Filed: July 29, 1969

[21] Appl. No.: 845,768

[52] U.S. Cl. .......... 179/100.11
[51] Int. Cl. .......... G11b 31/00
[58] Field of Search .......... 179/100.11

[56] References Cited

UNITED STATES PATENTS

| | | | |
|---|---|---|---|
| 2,536,123 | 1/1951 | Berry | 179/100.11 |
| 2,662,975 | 12/1953 | Schwartz | 179/100.11 X |
| 3,400,227 | 9/1968 | Lear et al. | 179/100.11 |
| 3,536,859 | 10/1970 | Tolar | 179/100.11 |

*Primary Examiner*—Raymond F. Cardillo, Jr.

[57] ABSTRACT

A combined radio receiver and tape cartridge player for automobiles is provided with a pivotal radio tuning dial covering the receptacle for a tape cartridge and with a switch for automatically selecting the operation of the tape player or radio, actuated by the insertion or removal of the cartridge.

7 Claims, 8 Drawing Figures

COMBINED RADIO RECEIVER AND TAPE CARTRIDGE PLAYER FOR AUTOMOBILES

This invention relates to improvements in combined radio receiver and tape cartridge player sets, particularly for automobiles.

The use of combined radio receiver and tape player sets is becoming more and more widespread, particularly in the case where the tape player comprises an exchangeable cartridge containing the magnetic tape, due to its simple way of operation. Especially in automobiles, where the attention of the driver should be diverted as little as possible, this is an important advantage.

Heretofore, many different combinations of radio receiver and tape cartridge players have been developed in which both elements are independently located apart from each other or wherein the radio receiver and tape player occupy independent parts of a common housing, the operation of each part being selected by means of a manual switch, thus requiring the attention of the driver. Moreover the outer dimensions of the housing must be necessarily larger than for a single radio receiver, which often does not permit its installation behind the dashboard of an automobile.

The object of the present invention is to solve these disadvantages by providing automatic selection of the operation of the set, either as radio receiver or as tape cartridge player, by the mere introduction of a conventional cartridge, and by providing the required space for introduction of a cartridge into a combined housing for the two devices without enlarging the space required for a radio.

For this purpose, the improvements according to the invention consist in arranging all the electrical and mechanical elements of both a radio receiver and a tape cartridge player, such as the amplifier means, radio tuning means, tape reproduction means, tape drive means and electrical switching means, in a generally U-shaped form so that they fit in a shallow housing for automobile radio receivers, at the same time defining behind the radio tuning dial a generally rectangular space for a tape cartridge.

The radio tuning dial is mounted in the front wall of the housing for movement between an operative and an inoperative position, and a cartridge can be pushed against said radio tuning dial and into said rectangular space where it actuates the electrical switching means for automatic selection of operation, while the playing of the tape is produced, in accordance with the usual practice, by means of driving and reproduction elements and common amplifier means.

Additionally, a second electrical switching means is provided inside the radio receiver and cartridge tape recorder set to allow the recording on the tape, which can be done by a simple connection of a microphone or by inter-connection with the radio frequency part of the same receiver for recording a radio transmission.

Other features, advantages and objects of the present invention will be apparent from the following description, with reference to the attached drawings, in which.

Figure 1:
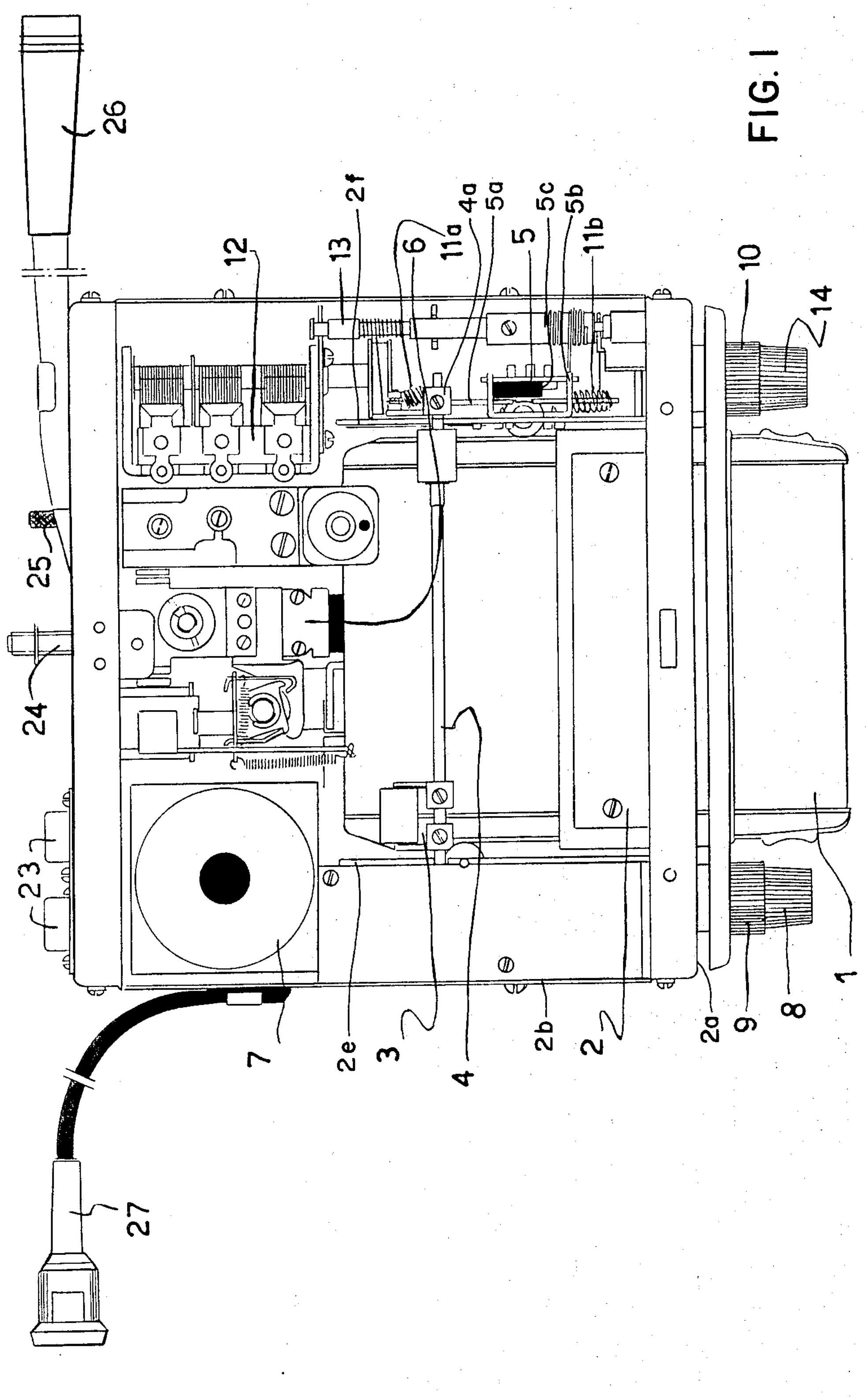
FIG. 1 is a top view of the radio receiver and tape cartridge player set with the cover removed, in position for operation as tape player, with an inserted cartridge.

Referring to the Figures, a tape cartridge 1 is pushed against the radio tuning dial 2 located in the front wall 2*a* of a housing 2*b* of a combined radio receiver and tape cartridge player set according to the invention. Said radio tuning dial is mounted for rotation about its upper edge, being provided with well known means, such as a spring, for movement between a vertical operative position for operation of the radio receiver, thus covering a slot opening 2*c* provided in said front wall of the housing to receive a cartridge, and a horizontal inoperative position to permit insertion of a tape cartridge through said slot opening and into the space 2*d* defined behind said radio tuning dial.

Intermediate walls 2*e* and 2*f* of the housing, laterally limiting said space 2*d*, bear means for engagement with an inserted cartridge comprising a rotatable transverse shaft 4, a lever 3 being fixedly arranged near one end of said shaft and a lever 4*a* being fixedly arranged at the other end of said shaft. Selecting means comprises a tension spring 11*a* which is connected at one of its ends to said lever 4*a* while its other end is connected to one end of a rod 5*a*. Said rod is supported and guided by a frame 5*b* fixed to the intermediate wall 2*f*, both ends of said rod projecting outside of said frame. Inside of said frame the rod 5*a* is firmly attached to a sliding contact element 5*c* of a conventional double position switch 5 fixed to said frame for operation either of the radio elements or of the tape player elements. The other end of said rod 5*a* is fixed to a pressure spring 11*b* which surrounds the rod and rests on said frame 5*b*.

When a cartridge 1 is inserted in space 2*d* it actuates lever 3, thus rotating shaft 4 and lever 4*a* which imparts a longitudinal movement to the rod 5*a* by means of spring 11*a*, the sliding contact element 5*c* being urged to change its position, according to the function of said double position switch 5. This contact position, shown in FIG. 1, automatically connects the recording head 6 and the driving motor 7 for the tape with the amplifier means 21 and the receiver means 22 and the power input connection means 27.

The reproduction volume and tone of the amplifier means is regulated, in accordance with the usual practice in this field, by means of two independent controls 8 and 9 provided on a common shaft and a third control 10.

When the tape cartridge 1 is removed from the set the lever 3 is released from its engagement with the cartridge, thus allowing rotation of the transverse shaft 4 as a result of the contraction of spring 11*a*. This contraction causes the rod 5*a* to be urged by the pressure of spring 11*b*, so that the contact element 5*c* is urged to slide to the initial contact position, shown in FIG. 2, of said double position switch 5, automatically connecting the amplifier means 21 and 22 and the power input connection means 27 with the radio tuning means, such as a variable condenser 12, rotated by a selecting shaft 13 and a control 14, the controls for the amplifier being said controls 8, 9 and 10.

Figure 2:
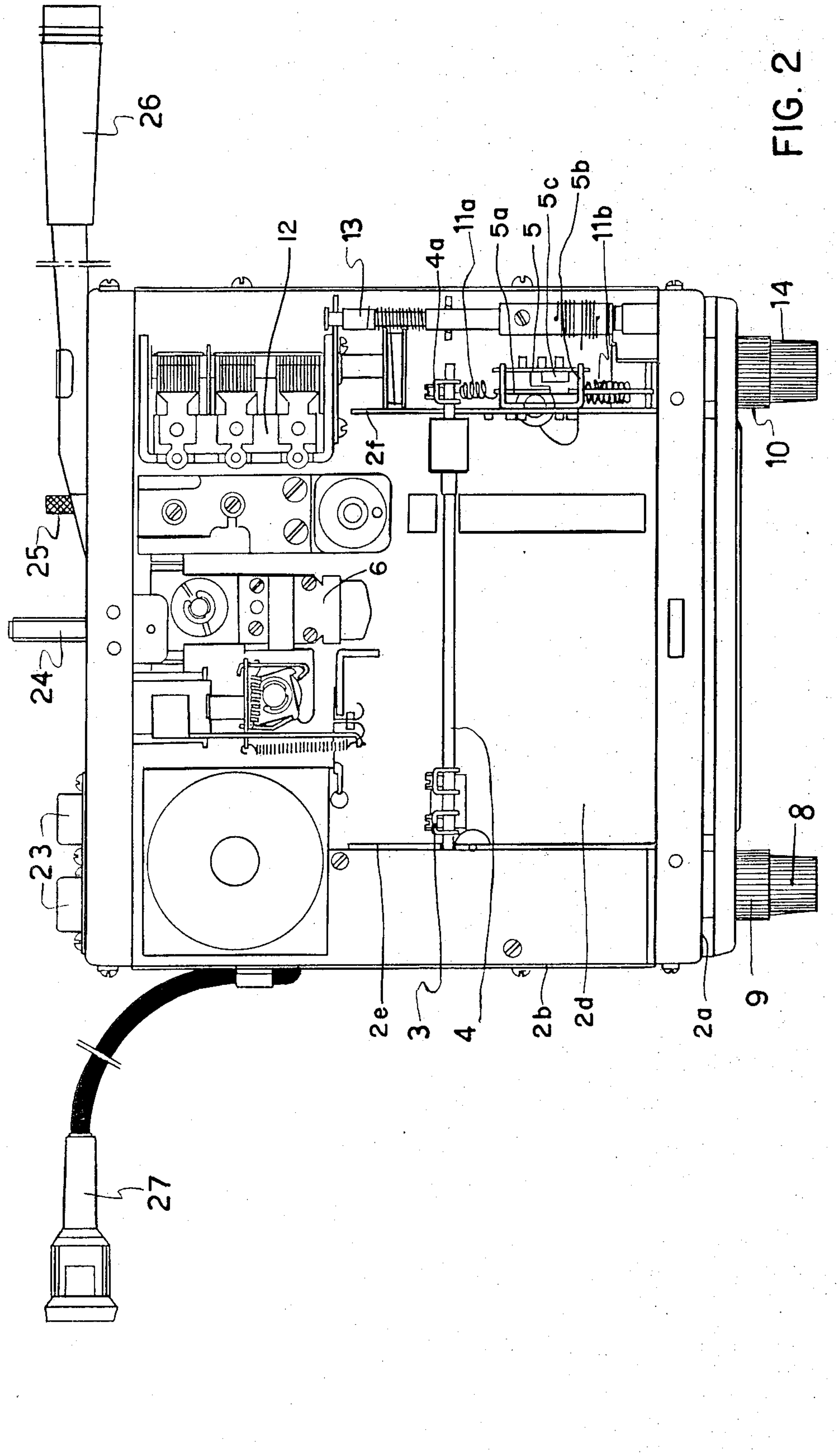
FIG. 2 is a top view of the same set as shown in FIG. 1, but in position for operation as radio receiver.
Figure 3:
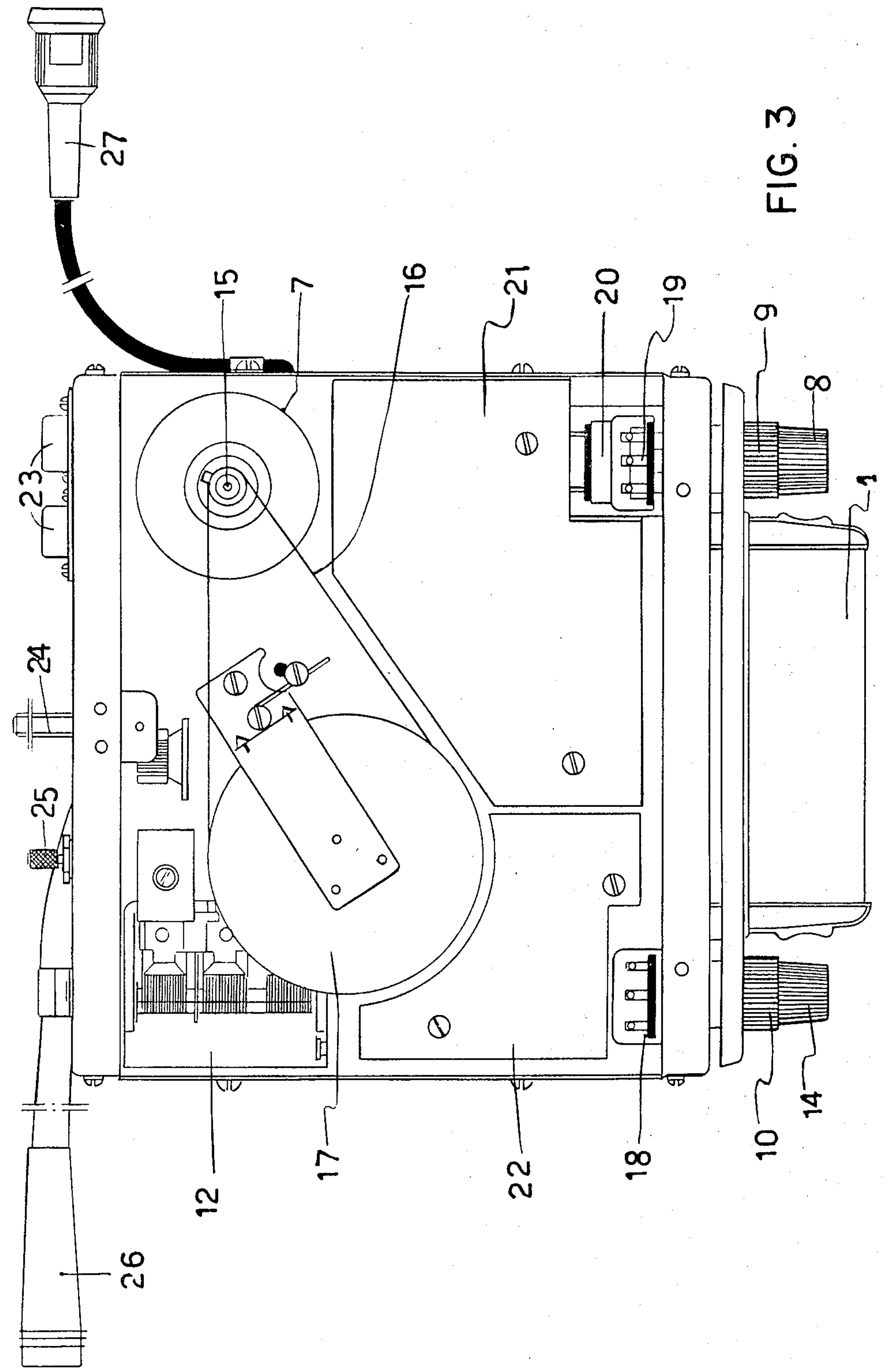
FIG. 3 is a bottom view of the set shown in FIG. 1.
Figure 4:
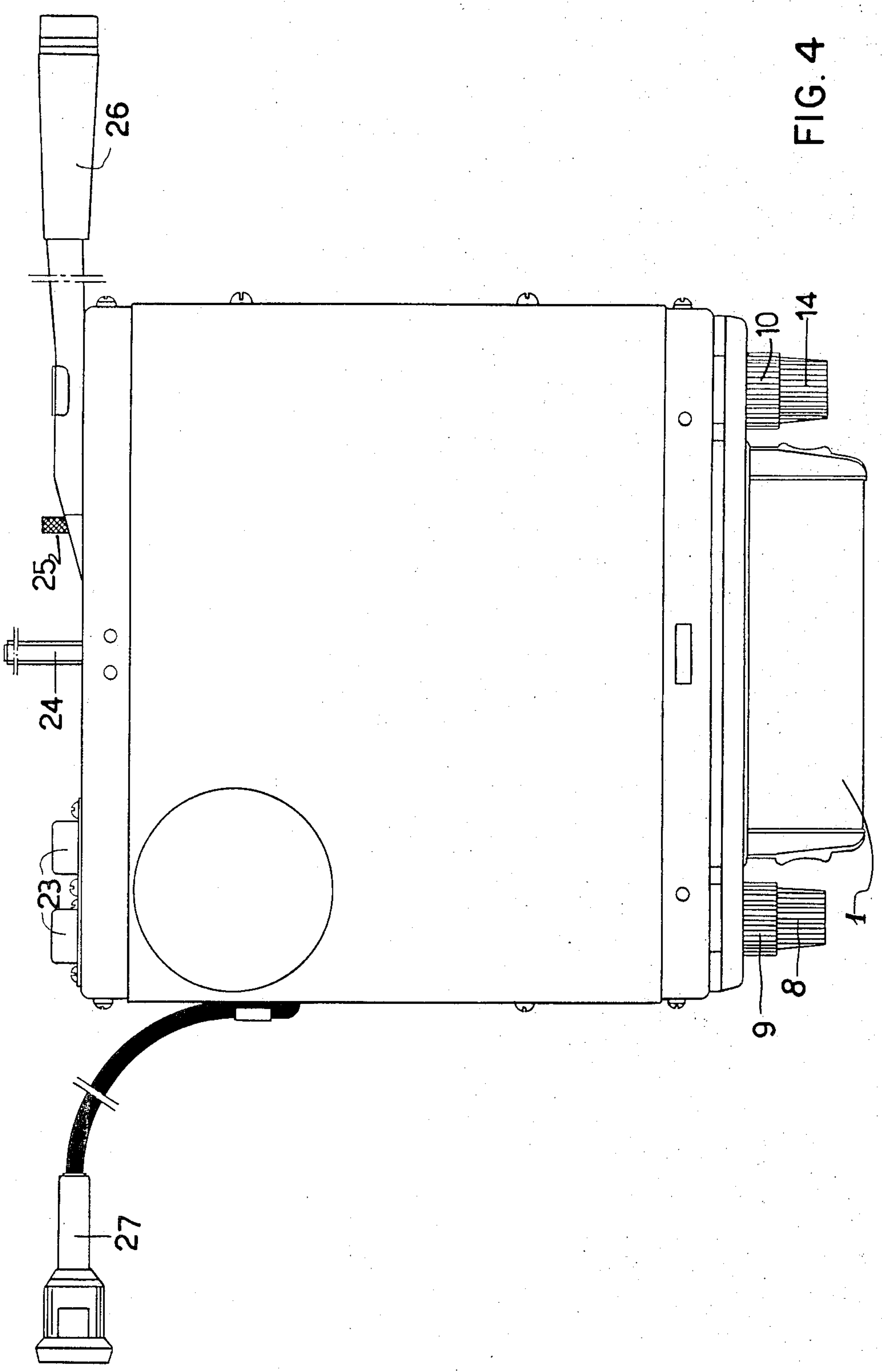
FIG. 4 is a top view of the set shown in FIG. 1, with the cover in place.
Figure 5:
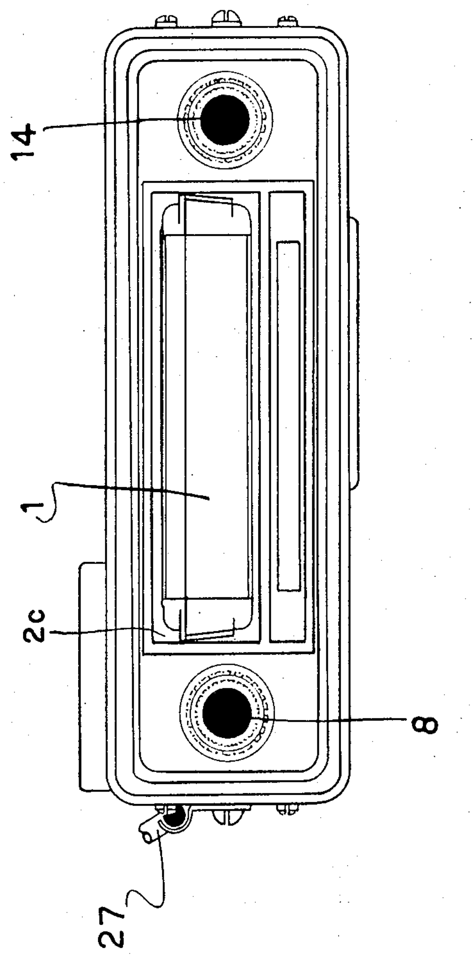
FIG. 5 is a front view of the set in position of operation as tape player.
Figure 6:
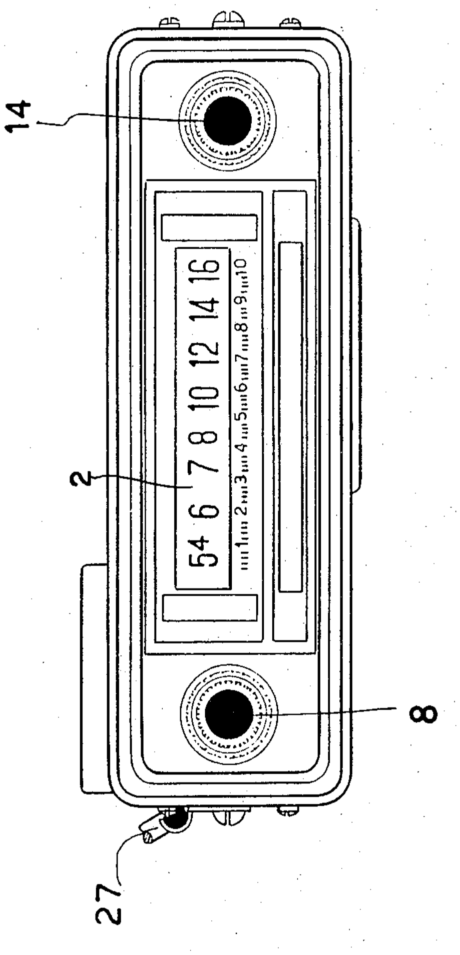
FIG. 6 is a front view of the set in position of operation as radio receiver.
Figure 7:
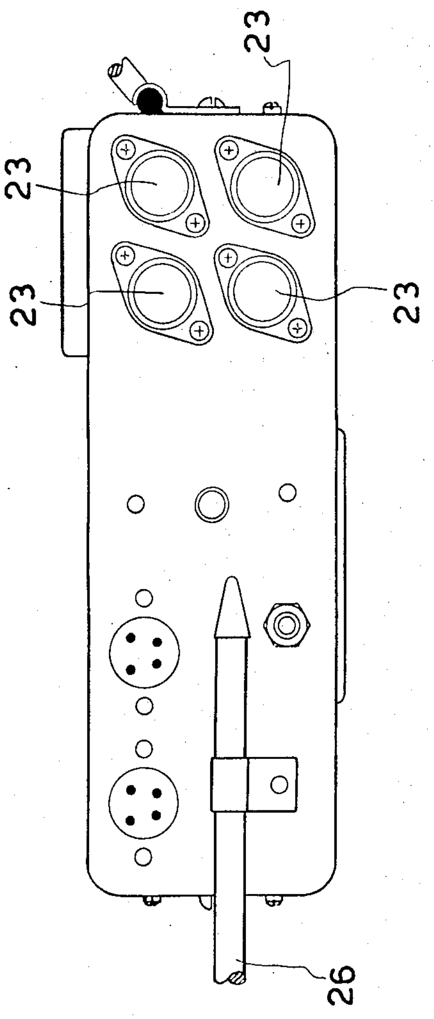
FIG. 7 is a rear view of the same.
Figure 8:
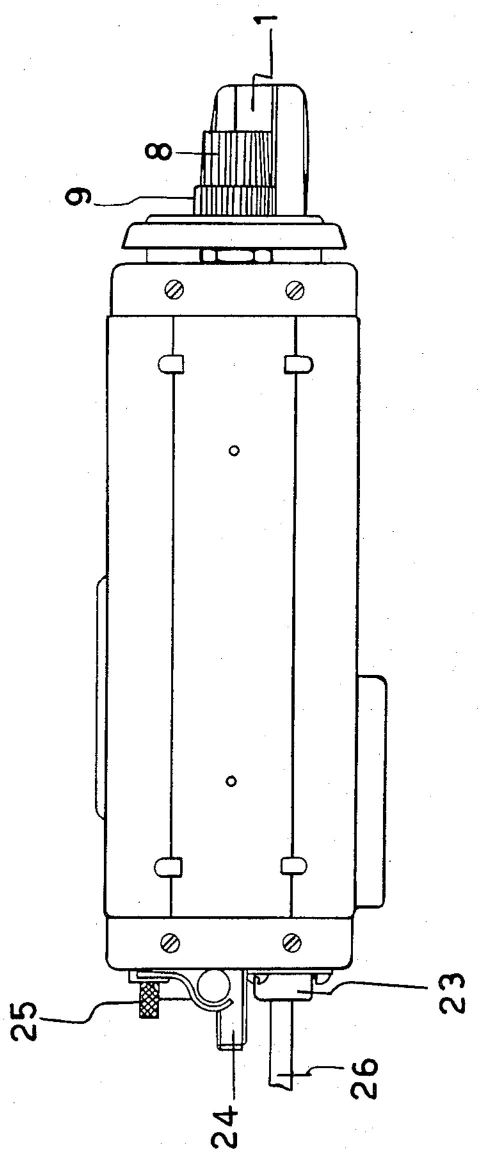
FIG. 8 is a side view of the radio receiver and tape cartridge player set.

As shown particularly in FIGS. 2 and 3, an electric motor 7 is arranged in the rear left corner of the housing 2*b*, which fills the space between the upper and lower walls in that corner of the housing. A transmission wheel 17 actuated by a transmission belt 16 and the motor shaft 15 is located in the lower part of the housing, defining an inferior plane together with two printed circuits 21 and 22 comprising electrical amplifying and receiving means, these latter being provided with openings so as to fit around the potentiometer 18, the potentiometer 19 and the power control 20 of the set. The variable condenser 12 is located at a higher lever in the rear right corner of the housing, the space between motor and condenser being occupied by the tape player elements, such as the recording head 6 and the tape drive head. On the right and left side of the housing, above said inferior plane, the double position switch 5 and several mechanical and electrical elements are located. Attached to the outside of the back wall of the housing are the transistors 23, a housing support screw 24, a control 25, an antenna connection 26 and a power connection 27.

It is well understood that changes may be made within the scope of the present invention which is further defined in the annexed claims.

I claim:

1. In a combined radio receiver and tape cartridge player for automobiles, comprising a shallow housing having a front wall, a slotted opening provided in said front wall to removably receive a tape cartridge, a radio tuning dial pivotally mounted in said front wall for movement between an operative upright position covering said slotted opening and an inoperative substantially horizontal position, said dial being responsive to insertion of a cartridge into said slotted opening to move the dial into said horizontal position and responsive to withdrawal of a cartridge to return it to said upright position, two-position electrical switching means including a slidable contact element having a first position for operation of said radio receiver and a second position for operation of said tape cartridge player, actuating means pivotally mounted in said housing for engagement with said tape cartridge at a predetermined position in the slotted opening and connected with said sliding contact element, and biassing means urging the slidable contact element towards said first position, said slidable contact element being selectively movable, independently of the movement of the dial, to the second position only in response to the insertion of a tape cartridge into said slotted opening beyond said predetermined position, said slidable contact element being returned towards said first position in response to withdrawal of the tape cartridge beyond said predetermined position.

2. The invention defined in claim 1, wherein said radio tuning dial is mounted for rotation about its upper edge.

3. The invention defined in claim 1, wherein said combined radio receiver and tape cartridge player includes amplifier means, radio tuning means, tape reproduction means and tape drive means, said amplifier means, radio tuning means, tape reproduction means, tape drive means and electrical switching means being arranged in a generally U-shaped form inside said housing thus defining a generally rectangular space for the cartridge immediately behind said movable radio tuning dial.

4. The invention defined in claim 3, wherein said tape drive means comprises an electric motor, a transmission wheel and a transmission belt, said electric motor being arranged in a rear corner of the housing and said transmission wheel and transmission belt defining an inferior plane inside said housing, said amplifier means comprises two printed circuits, said circuits being located in said inferior plane around said transmission wheel and said motor, said tuning means comprises a variable condenser, said condenser being arranged in a rear corner of the housing at a level above said inferior plane, said tape reproduction means comprises a recording head, said head being placed between said motor and said condenser, and said electrical switching means is laterally arranged in the housing.

5. The invention defined in claim 1, wherein said housing is provided with mounting means for said actuating means, comprising two intermediate walls and a frame fixed to one of said intermediate walls.

6. The invention defined in claim 5, wherein said actuating means comprises a rotatable transverse shaft supported by said intermediate walls and provided with a first lever, fixedly arranged on said shaft, for engagement with an inserted cartridge, and with a second lever, also fixedly arranged on said shaft and connected with said slidable contact element selecting means.

7. The invention defined in claim 5, wherein said slidable contact element is located within said frame, and said electrical switching means includes a rod firmly attached to said contact element, and supported and guided by said frame, projecting with its two ends outside of said frame, a tension spring fixed to one of said ends of the rod for connecting with said actuating means for engagement with an inserted cartridge, and a pressure spring fixed to the other end of said rod and resting on said frame.

* * * * *